US012739955B2

(12) United States Patent
Hagihara et al.

(10) Patent No.: US 12,739,955 B2
(45) Date of Patent: Sep. 15, 2026

(54) VEHICLE INTERIOR LIGHTING ASSEMBLY WITH FLEXIBLE LED SHEET

(71) Applicant: Honda Motor Co., Ltd., Tokyo (JP)

(72) Inventors: Tomoya Hagihara, Novi, MI (US); Antonio Emilio Sanchez Aguilar, Birmingham, MI (US)

(73) Assignee: Honda Motor Co., Ltd, Tokyo (JP)

( * ) Notice: Subject to any disclaimer, the term of this patent is extended or adjusted under 35 U.S.C. 154(b) by 78 days.

(21) Appl. No.: 18/826,633

(22) Filed: Sep. 6, 2024

(65) Prior Publication Data

US 2024/0431002 A1 Dec. 26, 2024

Related U.S. Application Data

(62) Division of application No. 18/062,129, filed on Dec. 6, 2022, now Pat. No. 12,114,405.

(51) Int. Cl.

| | |
|---|---|
| ***H05B 45/50*** | (2022.01) |
| ***B60Q 3/50*** | (2017.01) |
| ***B60Q 3/60*** | (2017.01) |
| ***F21V 14/04*** | (2006.01) |
| ***F21V 23/00*** | (2015.01) |
| ***H05B 47/105*** | (2020.01) |
| *F21Y 115/10* | (2016.01) |

(52) U.S. Cl.

CPC ............... *H05B 45/50* (2020.01); *B60Q 3/50* (2017.02); *B60Q 3/60* (2017.02); *F21V 14/04* (2013.01); *F21V 23/003* (2013.01); *H05B 47/105* (2020.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 9,175,820 | B2 | 11/2015 | Grote, III et al. | |
| 9,985,247 | B2 | 5/2018 | Jaganathen | |
| 2009/0073708 | A1 | 3/2009 | Kino et al. | |
| 2010/0165650 | A1 | 7/2010 | Kino et al. | |
| 2012/0235579 | A1* | 9/2012 | Chemel | F21V 14/02 315/152 |
| 2015/0360606 | A1 | 12/2015 | Thompson et al. | |
| 2016/0214529 | A1* | 7/2016 | Valentine, Jr. | B60Q 3/47 |
| 2020/0317121 | A1 | 10/2020 | Ikeda et al. | |
| 2020/0375016 | A1* | 11/2020 | Hutson | H05B 41/40 |

(Continued)

FOREIGN PATENT DOCUMENTS

| | | | |
|---|---|---|---|
| CN | 101329017 | B | 7/2012 |
| DE | 102014205214 | A1 | 9/2015 |

(Continued)

*Primary Examiner* — Anh Q Tran

(74) *Attorney, Agent, or Firm* — Plumsea Law Group, LLC

(57) ABSTRACT

A vehicle interior lighting assembly includes a housing configured to contain lighting components, a lens through which light may be projected from the housing, and a light source including a flexible sheet including one or more light emitting diodes (LEDs). The flexible sheet includes a first, larger portion disposed at a first orientation at an oblique angle with respect to the lens, and a second, smaller portion disposed at a second orientation that is substantially aligned with the lens. At least one of the one or more LEDs is disposed on the second, smaller portion of the flexible sheet.

17 Claims, 7 Drawing Sheets

(56) References Cited

U.S. PATENT DOCUMENTS

| | | | |
|---|---|---|---|
| 2021/0131652 | A1 | 5/2021 | Zak et al. |
| 2022/0111731 | A1 | 4/2022 | Zhao et al. |

FOREIGN PATENT DOCUMENTS

| | | | |
|---|---|---|---|
| EP | 3819535 | A1 | 5/2021 |
| JP | 4629008 | B2 | 2/2011 |
| JP | 6996938 | B2 | 1/2022 |

* cited by examiner

VEHICLE INTERIOR LIGHTING ASSEMBLY WITH FLEXIBLE LED SHEET

REFERENCE TO RELATED APPLICATIONS

This application is divisional of co-pending application Ser. No. 18/062,129, filed on Dec. 6, 2022, the entirety of which is hereby incorporated by reference.

TECHNICAL FIELD

The present disclosure generally relates to an interior lighting assembly for vehicle applications and, more particularly, to an interior lighting assembly implementing a flexible light emitting diode (LED) sheet.

BACKGROUND

Use of LEDs for lighting applications has many benefits, such as energy efficiency, longevity, and design flexibility. Accordingly, it is desirable to utilize LEDs for vehicle interior illumination. However, since vehicle interior lighting assemblies are generally installed in thin-walled locations, such as door panels, window pillars, roof liners, etc., the space available for lighting assemblies can be limited. Because of this limited space, the orientation of lighting elements, such as individual LED's may be less than optimal. This can lead to brightness "hotspots" where illumination from multiple LEDs show individually through a lens of a lighting assembly. This can result in not only an unappealing appearance but a reduction in lighting output.

The present disclosure is directed to lighting assemblies that utilize flexible LED sheets that can include portions angled to optimally direct light through the lens of the assembly. Alternatively, or additionally, the lighting assemblies may use reflective components to direct additional light out through the lens. In some embodiments, these reflective components may be movable based on real-time feedback regarding lighting performance in the vehicle interior.

In some cases, such lighting assemblies may be components of a vehicle interior lighting system that includes multiple lighting assemblies. In addition, the system may include a controller configured to receive lighting performance information from components of the system and adjust output of select lighting assemblies to compensate for other lighting assemblies that are underperforming.

SUMMARY

In one aspect, the present disclosure is directed to a vehicle interior lighting assembly, including a housing configured to contain lighting components, a lens through which light may be projected from the housing, and a light source including a flexible sheet including one or more light emitting diodes (LEDs). The flexible sheet includes a first, larger portion disposed at a first orientation at an oblique angle with respect to the lens, and a second, smaller portion disposed at a second orientation that is substantially aligned with the lens. At least one of the one or more LEDs is disposed on the second, smaller portion of the flexible sheet.

In another aspect, the present disclosure is directed to a vehicle interior lighting system, including a first vehicle interior lighting assembly, a lens through which light may be projected, and a light source including a flexible sheet including one or more light emitting diodes (LEDs) arranged to project light through the lens. The flexible sheet includes a first, larger portion disposed at a first orientation at an oblique angle with respect to the lens, and a second, smaller portion disposed at a second orientation that is substantially aligned with the lens. In addition, at least one of the one or more LEDs is disposed on the second, smaller portion of the flexible sheet. The system further includes a controller including a device processor and a non-transitory computer readable medium including instructions executable by the processor to control operation of the lighting assembly.

In another aspect, the present disclosure is directed to a method of illuminating a vehicle interior. The method includes using a device processor to execute the following instructions stored on a non-transitory computer readable medium: receiving lighting performance information regarding a first lighting assembly; receiving lighting performance information regarding a second lighting assembly; making a determination that the second lighting assembly is not operating as intended; and adjusting operation of the first lighting assembly to at least partially compensate for a reduction in lighting performance of the second lighting assembly.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The disclosed invention relates generally to a vehicle interior lighting system. As such, the invention can be used in connection with any type of vehicle that includes an enclosed or semi-enclosed cabin or cockpit. Thus, the term "vehicle" as used throughout the specification and claims refers to any moving vehicle that is powered by any form of energy and includes an illuminatable interior cabin, cockpit, and/or cargo area. For example, it will be understood that the term "vehicle," as used herein, refers to cars, trucks, vans, minivans, sport utility vehicles (SUV's), construction equipment, watercraft, aircraft, and other such vehicles. It will be further understood that, when referring to a "vehicle," the present disclosure also encompasses trailers that may be pulled by a powered vehicle. That is, the disclosed lighting assemblies may be disposed in an enclosed or semi-enclosed trailer. Such trailers may be configured to transport cargo and/or people.

Figure 1:
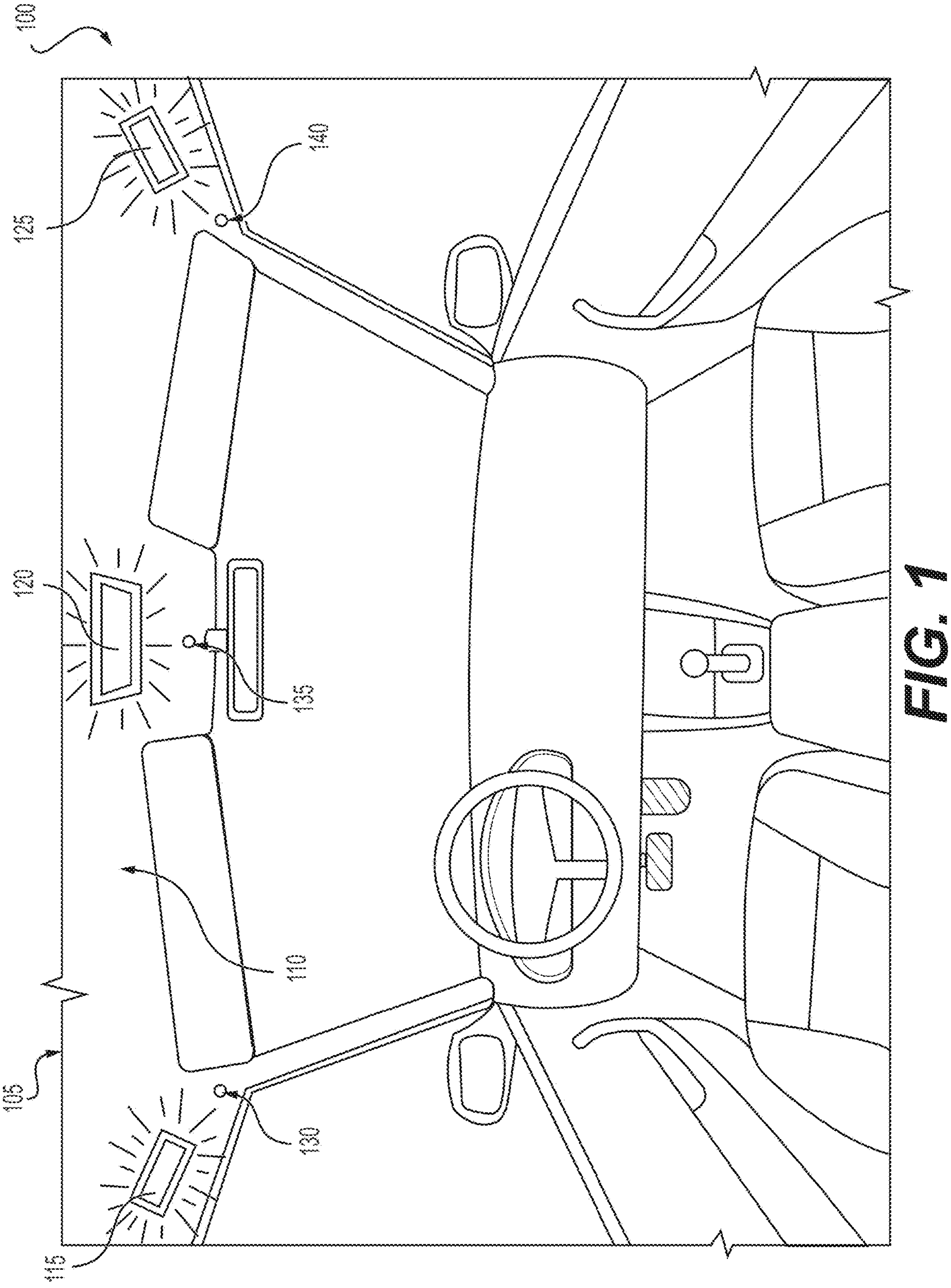
FIG. 1 is a schematic illustration of a vehicle interior including multiple ambient lighting assemblies.

FIG. 1 is a schematic illustration of a vehicle interior including multiple ambient lighting assemblies. It will be understood that the depiction and arrangement in FIG. 1 are exemplary and schematic and that, therefore, the vehicle interior as well as the arrangement of lighting assemblies may vary.

As shown in FIG. 1, a vehicle 100 includes a vehicle interior 105. Vehicle interior 105 may be defined, in part, by a ceiling 110. Ceiling 110 may include a roof liner, which may be formed by fabric, sound deadening material, and other components that line the structural material of the vehicle's roof.

As shown in FIG. 1, vehicle interior 105 includes a plurality of lighting assemblies. In particular, vehicle interior 105 is shown having a first vehicle interior lighting assembly 115, a second vehicle interior lighting assembly 120, and a third vehicle interior lighting assembly 125. It will be understood that the number of interior lighting assemblies included in the system may vary. In addition, the placement of the lighting assemblies may also vary. The lighting assemblies shown in FIG. 1 are disposed in the roof liner of ceiling 110. However, additionally or alternatively, interior lighting assemblies according to the disclosed invention may be disposed in other portions of the vehicle, such as in door panels, in the dashboard, in the kick panels, under the dashboard, under the seats, and any other portions of the vehicle interior from which it may be desirable to provide illumination.

In some embodiments, the lighting assemblies are included as part of a closed loop system in which operation of the lighting assemblies is controlled based on feedback about the output of one or more of the lighting assemblies in the system. Operational capabilities of the system are discussed in greater detail below. Among the hardware components of the system may be one or more sensors configured and arranged to monitor the performance/output of the various lighting assemblies of the system. For example, as shown in FIG. 1, the system includes a first light sensor 130, a second light sensor 135, and a third light sensor 140. These light sensors may be separate components from the lighting assemblies and may have any configuration suitable for detecting the output/performance of the lighting assemblies.

It will be understood that the number of light sensors may vary. In some cases, the number of sensors corresponds with the number of lighting assemblies. In some embodiments, the sensors are configured to assess the output/performance of individual lighting assemblies. As such, the sensor readings may be evaluated individually and/or collectively to assess the output/performance of each lighting assembly.

In FIG. 1, each light sensor is located proximate to a corresponding lighting assembly. That is, first light sensor 130 is located proximate first lighting assembly 115. Second light sensor 135 is located proximate second lighting assembly 120. And, third light sensor 140 is located proximate third lighting assembly 125. By being located proximate to a corresponding lighting assembly, each sensor may be configured to detect the output-performance of that lighting assembly. Additionally, or alternatively, light sensors may be located away from their corresponding lighting assembly, but in an area that is illuminated by the lighting assembly. For example, the system may include a ceiling-mounted lighting assembly arranged to project light onto the steering wheel of the vehicle, and a corresponding light sensor that is mounted in the steering wheel area (e.g., on the steering column).

The individual lighting assemblies of the disclosed system may vary in construction. In some cases, more than one lighting assembly of the system may have the same construction. In some cases, two or more lighting assemblies may have differing constructions from one another.

Figure 2:
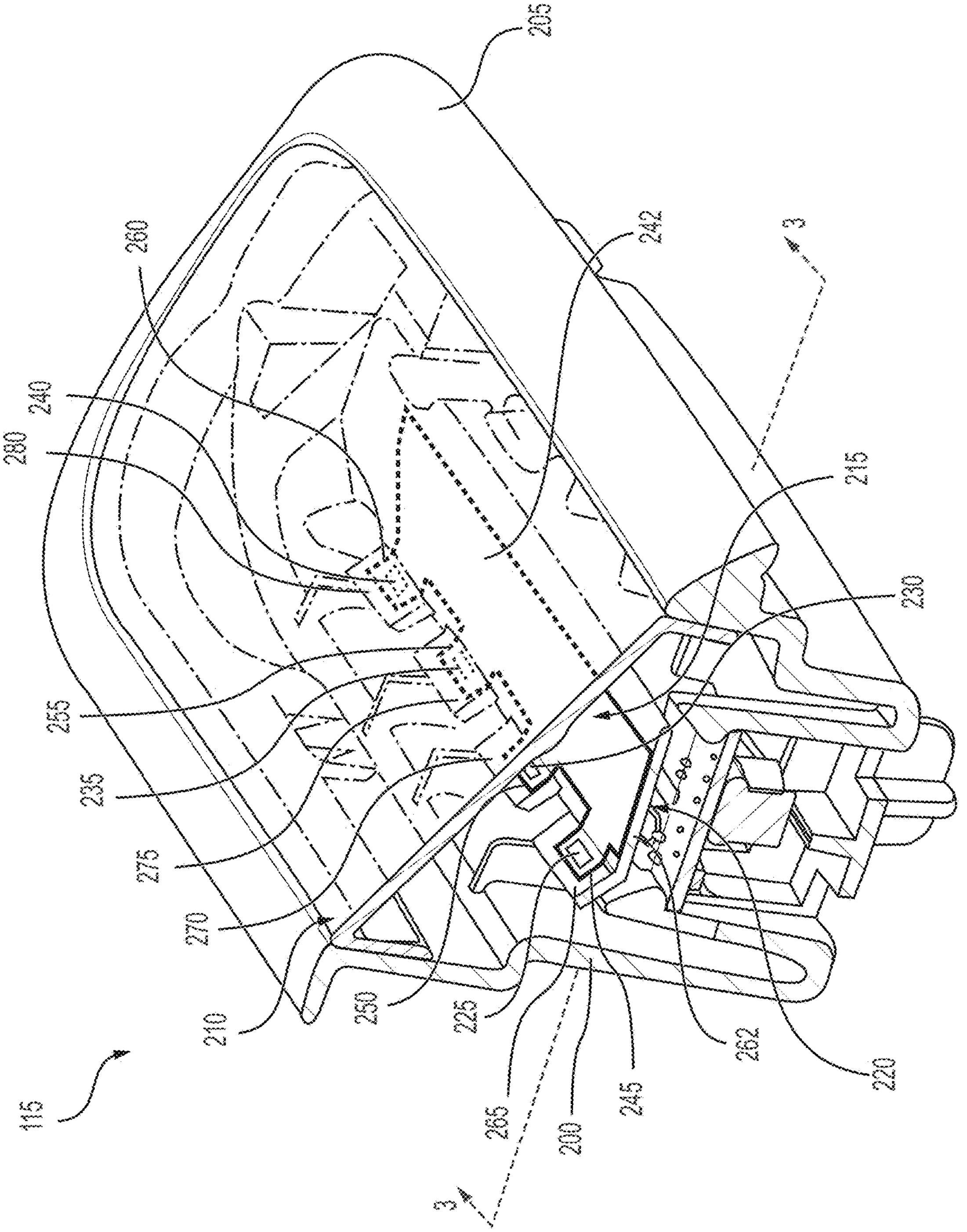
FIG. 2 is a schematic cutaway cross-sectional view of a vehicle interior lighting assembly.

FIG. 2 is a schematic cutaway cross-sectional view of an exemplary vehicle interior lighting assembly. In particular, FIG. 2 illustrates one of the lighting assemblies shown in FIG. 2, specifically, first lighting assembly 115. As shown in FIG. 2, first lighting assembly 115 includes a housing 200 configured to contain lighting components, including various electronic components. First lighting assembly 115 also includes a flange 205 configured to facilitate mounting of first lighting assembly 115 in the ceiling of the vehicle. That is, flange 205 sits flush against the roof liner and housing 200 extends into the ceiling into the space between the roof liner and the structural outer roof panel.

The space between the roof liner and the structural outer roof panel may be limited. Accordingly, housing 200 is configured to extend at an oblique angle with respect to the roof liner. By extending housing 200 at an oblique angle, housing 200 has a shallower mounting depth despite maintaining a larger size/volume, which enables housing 200 to accommodate more and/or larger electronic componentry than if it extended perpendicular to the roof liner and had the same shallow mounting depth. Enclosing the housing is a lens 210 through which light may be projected from housing 200. Housing 200, therefore, extends at an oblique angle with respect to lens 210.

Lens 210 may have any suitable construction. In some embodiments, lens 210 may be formed of plastic or glass. In some cases, lens 210 may be transparent/clear. In some cases, lens 210 may be translucent. As discussed below, first lighting assembly 115 includes multiple LEDs configured to project light through lens 210. Accordingly, a translucent lens provides the appearance of a single light source, i.e., by concealing the individual light emission by each LED. As discussed in greater detail below, the disclosed invention includes provisions to reduce so-called "hot spots," which are areas of greater brightness transmitted through a translucent lens corresponding with a particular bulb or LED.

The disclosed lighting assembly includes a light source including a flexible sheet including one or more light emitting diodes (LEDs). In particular, the lighting assembly utilizes a flexible LED sheet in order to facilitate complex arrangements of the electronic components in the housing. As discussed in greater detail below, the flexible sheet includes a first, larger portion disposed at a first orientation at an oblique angle with respect to the lens, and a second, smaller portion disposed at a second orientation that is substantially aligned with the lens, wherein at least one of the one or more LEDs is disposed on the second, smaller portion of the flexible sheet.

As shown in FIG. 2, first lighting assembly 115 includes a flexible LED sheet 215. Associated with flexible LED sheet 215 is a support board 220. That is, flexible LED sheet 215 may be mounted on, secured to, or otherwise supported by support board 220. As shown in FIG. 2, flexible LED sheet 215 may include a plurality of LEDs configured to project light through lens 210. It will be understood that the number of LEDs will depend on the type and size of LED lighting elements, the size and shape of lighting assembly 115, the volume of space available within housing 210, the three-dimensional shape of housing 210, and other factors. First lighting assembly 115 shows four LEDs, including a first LED 225, second LED 230, third LED 235, and fourth LED 240.

As noted above, the flexibility of flexible LED sheet 215 enables a larger sheet to be used while still orienting the LEDs to maximize projection of light through lens 210. As shown in FIG. 2, a first, larger portion 242 of flexible LED sheet 215 extends at an oblique angle with respect to lens 210. Orienting larger portion 242 at an oblique angle with respect to lens 210 may enable a larger LED sheet to be used.

As also shown in FIG. 2, one or more smaller portions of flexible LED sheet 215 may be oriented in alignment with lens 210 in order to maximize the projection of LED output through lens 210. Each of the smaller portions of flexible LED sheet 215 extends from the first, larger portion 242 of flexible LED sheet 215 and has a surface area that is smaller than the surface area of the first, larger portion 242.

In some embodiments, each LED may be individually mounted on an angled projection of flexible LED sheet 215. For example, as shown in FIG. 2, flexible sheet 215 includes a first projection 245, on which first LED 225 may be mounted or otherwise incorporated/integrated. Similarly, flexible sheet 215 includes a second projection 250 associated with second LED 230, a third projection 255 associated with third LED 235, and a fourth projection 260 associated with fourth LED 240.

To support flexible LED sheet 215, support board 220 includes a first portion 262 configured to support first portion 242 of flexible LED sheet 215. In addition, support board 220 includes individual projections on which the projections of flexible LED sheet 215 are supported. In particular, support board 220 includes a first projection 265 supporting first projection 245 (of flexible LED sheet 215) and first LED 225. In addition support board 220 includes a second projection 270 supporting second projection 250 (of flexible LED sheet 215) and second LED 230. Further, support board 220 includes a third projection 275 supporting third projection 255 (of flexible LED sheet 215) and third LED 235. Also, support board 220 includes a fourth projection 280 supporting fourth projection 260 (of flexible LED sheet 215) and fourth LED 240.

The projections of flexible LED sheet 215 are angled with respect to first portion 242 of flexible LED sheet 215 because of the flexibility of flexible LED sheet 215. That is to say that the projections and first portion 242 are all part of one continuous LED sheet but a transition portion of flexible LED sheet 215 between first portion 242 and each projection is provided by a bend in flexible LED sheet 215.

Figure 3:
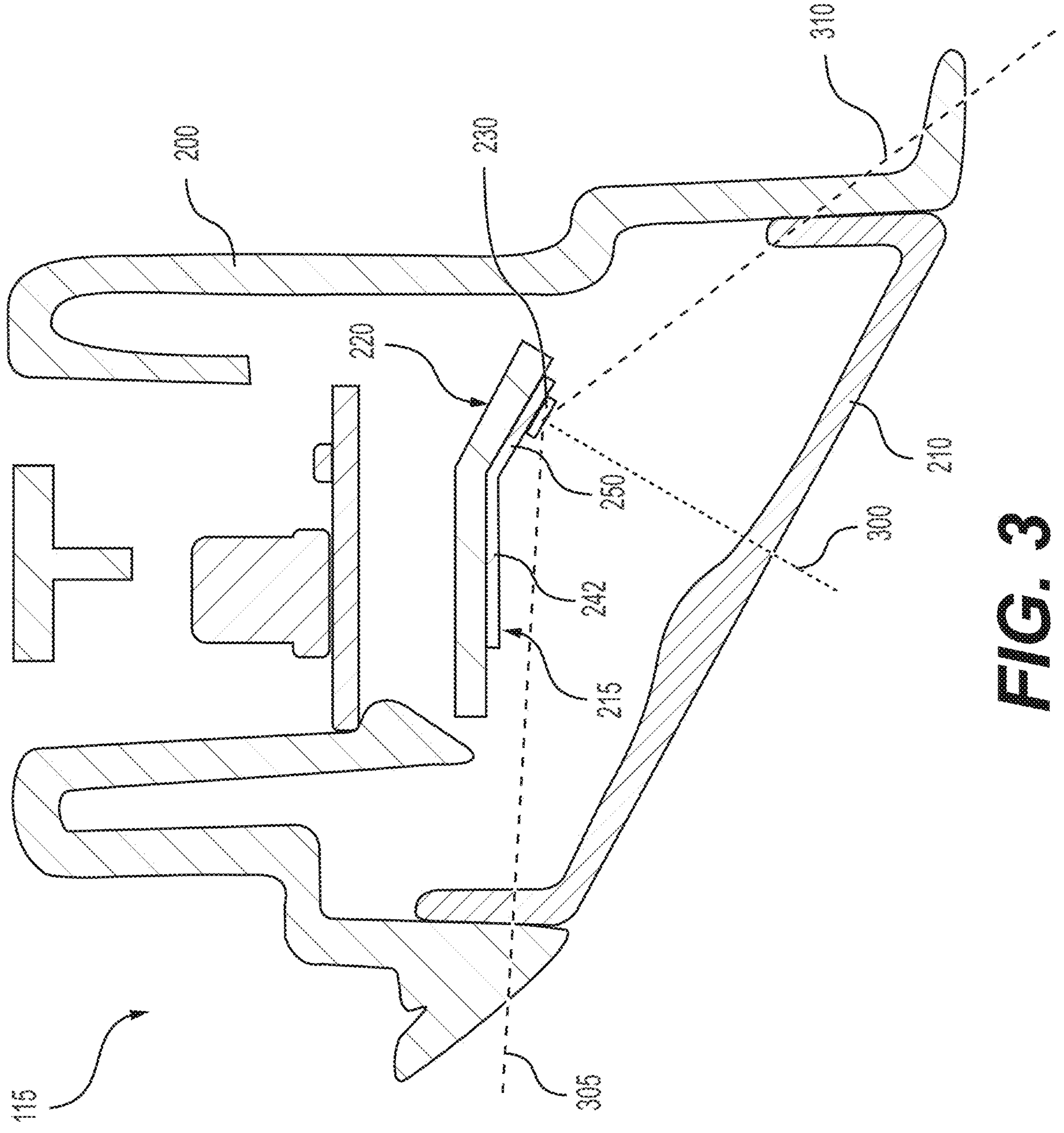
FIG. 3 is a schematic cross-sectional view of the vehicle interior lighting assembly of FIG. 2 taken at line 3-3.

FIG. 3 is a schematic cross-sectional view of the vehicle interior lighting assembly of FIG. 2 taken at line 3-3. FIG. 3 shows the oblique angle at which housing 200 extends from lens 210. In addition the orientation of flexible LED sheet 215 and support board 220 is also illustrated. This cross-sectional view is taken through second LED 230. As such, FIG. 3 shows the orientation of second led 230 (and second projection 250 of flexible LED sheet 215) in substantial alignment with lens 210. Because of this orientation in alignment with lens 210, the direction of light projection, as illustrated by an axis 300, is substantially perpendicular to LED 230 and second projection 250. With second LED 230 oriented in alignment with lens 210, the boundaries of its light projection are substantially evenly distributed proximate the edges of lens 210. For example, as shown in FIG. 3, a first boundary of LED projection 305 and a second boundary of LED projection 310 illustrate that the light between these boundaries that is projected from second LED 230 is nearly all directed through lens 210.

In contrast, if second LED 230 were not aligned with lens 210 (for example, if the entire LED sheet were oriented as first portion 242 of flexible LED sheet 215), nearly half of the light projected by second LED 230 would be directed at the inner wall of housing 200 (i.e., to the right-hand wall in FIG. 3). Thus, the alignment of second LED 230 with lens 210 maximizes the amount of light projected from first lighting assembly 115 by second LED 230. The same is true for the other LEDs of first lighting assembly 115.

Meanwhile, the angled orientation of first portion 242 of flexible LED sheet 215 enables a larger LED sheet to be utilized overall. This enables a more powerful LED sheet to be used, with a greater amount of electronics therein. It also enables first portion 242 of flexible LED sheet 215 to be oriented perpendicular to the oblique angle at which housing 200 extends from lens 210. This provides a packaging advantage, enabling more and larger electronic components to be incorporated into housing 200. Accordingly, there are two features that enable the use of more and/or larger electronic components in the housing. First, the angled orientation of housing 200 with respect to lens 210 enables a larger housing to be fit between the inner body panel (e.g., the roof liner) and the outer body panel of the vehicle. Second, the angled orientation of the larger portion 242 of the flexible LED sheet 215 enables a larger LED sheet and associated electronics to be fit in housing 200. In other words, the assembly utilizes a larger housing and a more efficient packaging of electronic components within that housing to provide a two tiered approach to maximizing fitment of electronics within the inner housing volume.

The disclosed system may include one or more reflective components to further augment the output/performance of the lighting assembly(s). Such reflective components may be configured to reflect additional light from the LEDs through the lens. For example, in some embodiments, one or more reflective components may be disposed proximate an edge area of the lens. In some embodiments, one or more reflective components may be movable to augment the output/performance of the lighting assembly. For example, the angle of orientation of the reflective component(s) may be rotated to augment the output of the lighting assembly. In some embodiments, the reflective component(s) may be translated laterally, or axially along an axis perpendicular with a reflective surface. In some embodiments, the reflective component(s) may be moved at an oblique angle. In some embodiments, the reflective component(s) may be translated and rotated.

Figure 4:
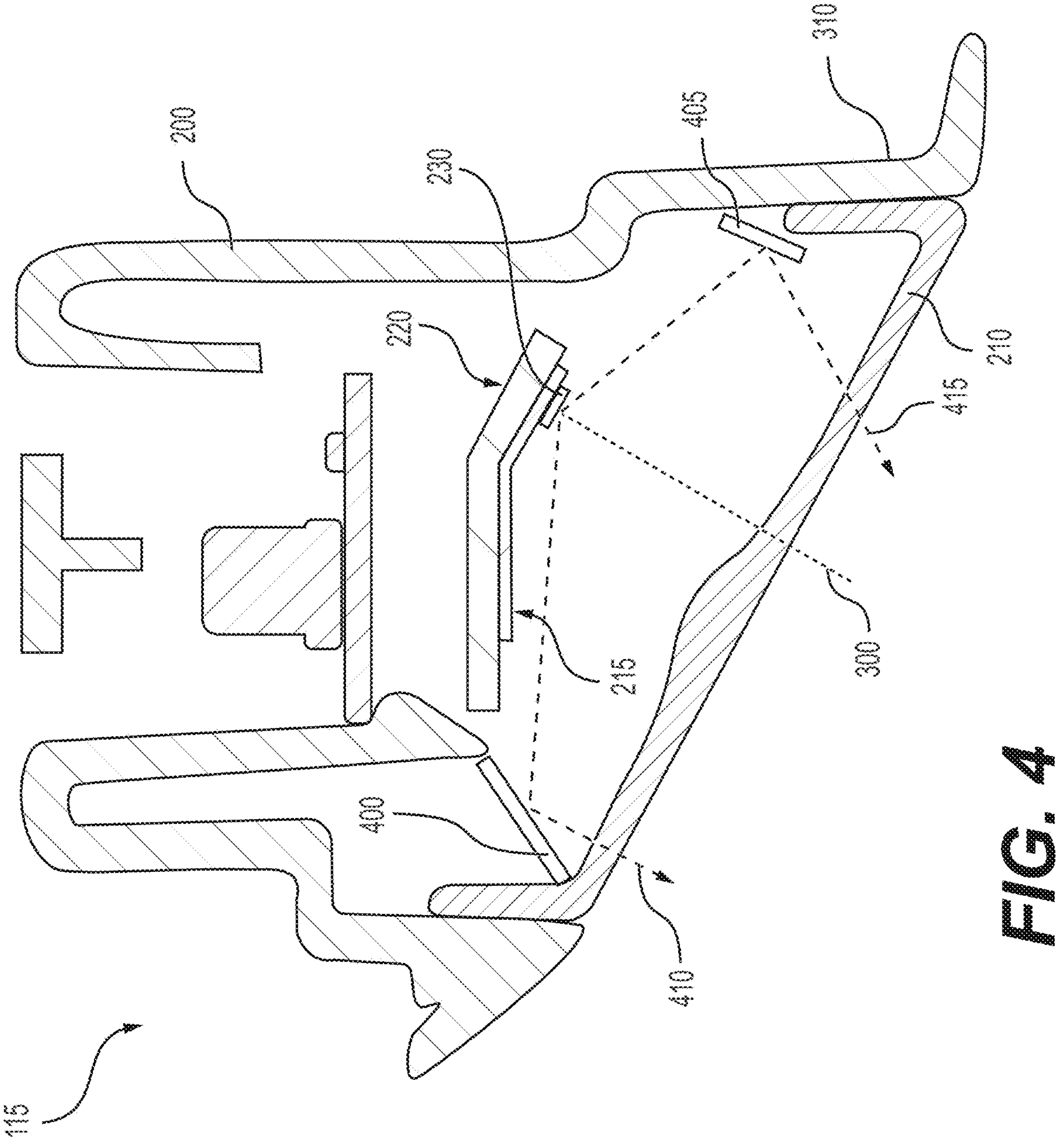
FIG. 4 is a schematic cross-sectional view of a vehicle interior lighting assembly including reflective components.

It will also be understood that the reflective components may have any suitable configuration. For example, the reflective components may be mirrors or other components with a reflective surface. The number of reflective components may also vary. In some embodiments, there may be a single reflective component in a given lighting assembly. In some embodiments, one or more reflective components may be included in at least one lighting assembly, but not in other lighting assemblies of a given system. Also, it will also be understood that the reflective components shown in FIG. 4 (and discussed in greater detail below) are shown schematically. For example, the reflective surfaces in FIG. 4 are shown as being substantially planar. However, additionally or alternatively, in some embodiments, the system may include reflective components having reflective surfaces that are curved, convex, or concave.

FIG. 4 is a schematic cross-sectional view of a vehicle interior lighting assembly including reflective components.

For example, as shown in FIG. 4, first lighting assembly 115 includes a first reflective component 400 proximate the left edge of lens 210. In addition, FIG. 4 shows a second reflective component 405 proximate the right edge of lens 210.

As indicated by a first arrow 410 in FIG. 4, light at the boundary of that projected by second LED 230 is reflected by first reflective component 400 and thereby redirected out through lens 210. Similarly, as indicated by as second arrow 415, light at an opposing boundary of that projected by second LED 230 is reflected by second reflective component 405 and thereby redirected out through lens 210. This increases the overall output of first lighting assembly 115. It will also be understood that there may be separate reflective components for each LED. In some embodiments, a single reflective component may be configured to reflect light from more than one LED.

The movement of the reflective components may be based on a realtime feedback loop in response to lighting performance information regarding the output/performance of the lighting assembly or other lighting assemblies of the system. The closed loop feedback control of the lighting assembly, including the reflective components, is discussed in greater detail below.

In some embodiments, the disclosed lighting system may include one or more reflective components that are separate from the lighting assembly. For example, a reflective component may be positioned proximate to a lighting assembly to redirect at least some of the light from the lighting assembly to a predetermined portion of the vehicle interior.

Figure 5:
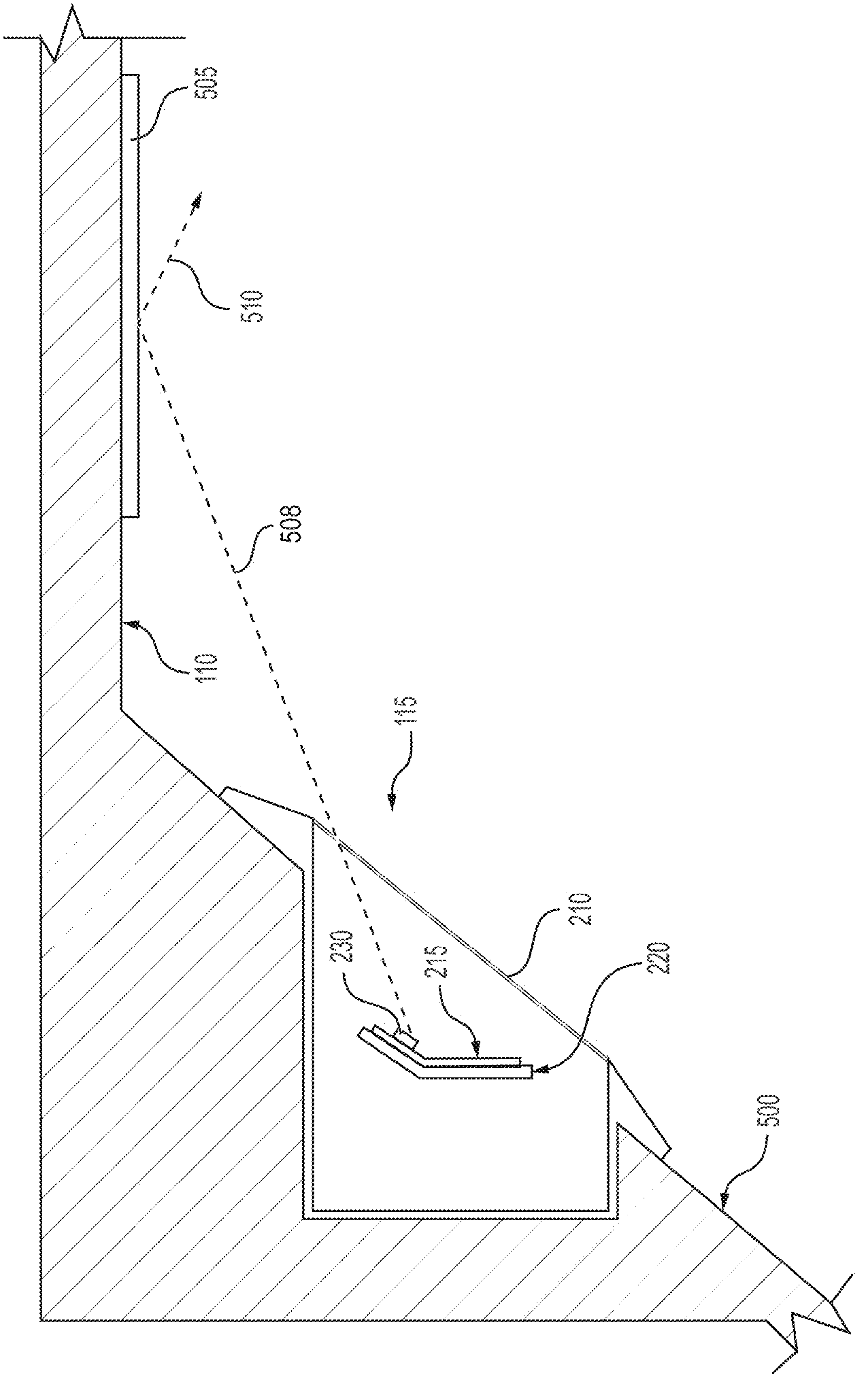
FIG. 5 is a schematic cross-sectional view of a vehicle interior with an installed vehicle interior lighting assembly and a separate reflective component.

FIG. 5 is a schematic cross-sectional view of a vehicle interior with an installed vehicle interior lighting assembly and a separate reflective component. As shown in FIG. 5, first lighting assembly 115 is mounted in a sidewall portion 500 of the vehicle ceiling 110. Accordingly, the light from first lighting assembly 115 may not be projected directly downward into the vehicle interior. In order to increase the amount of light projected downward, the system may include a reflective component 505. Reflective component 505 may be configured to redirect the light emitted from first lighting assembly 115 (indicated by dashed line 508) downward, as indicated by an arrow 510. This may add to the light projected downward into the cabin from first lighting assembly 115 and other lighting assemblies in the vehicle interior.

It will be understood that the separate reflective component 505 may also have a variety of configurations, like the reflective components discussed above (i.e., those internal to the lighting assembly), and may also be movable in various ways (also like the reflective components discussed above. The movement of the reflective components may be based on a real-time feedback loop in response to lighting performance information regarding the output/performance of the proximate lighting assembly or other lighting assemblies of the system. The closed loop feedback control of the separate reflective components is discussed in greater detail below.

As mentioned above, the lighting assemblies discussed herein may be implemented as part of a system controllable with real-time, closed loop feedback. Accordingly, the disclosed system can include not only lighting units, but also sensors and a controller.

Figure 6:
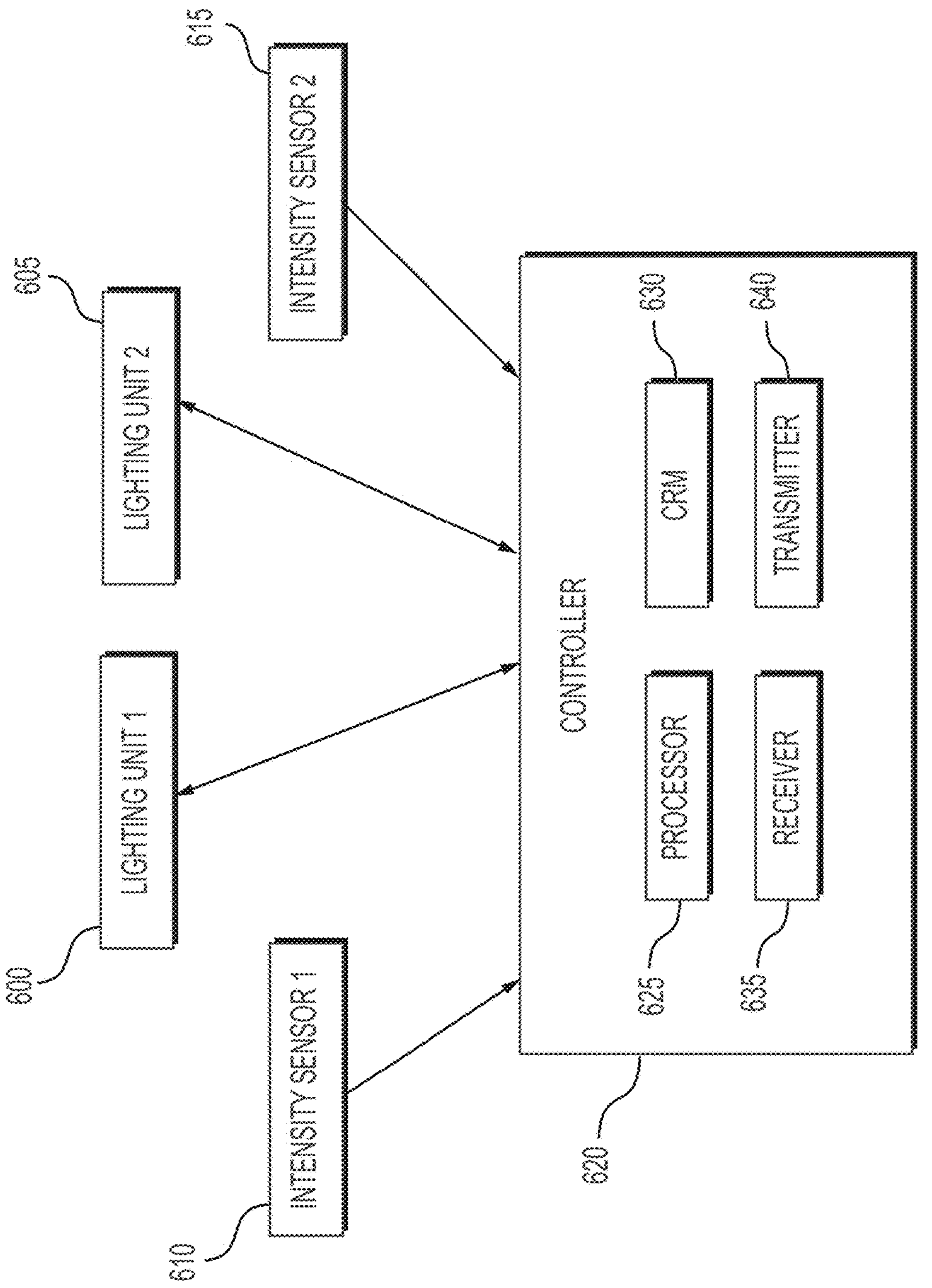
FIG. 6 is a schematic block diagram illustrating a vehicle interior lighting system.

FIG. 6 is a schematic block diagram illustrating a vehicle interior lighting system. As shown in FIG. 6, the exemplary system may include a first lighting unit 600 and a second lighting unit 605. It will be understood that the system may include any suitable number of lighting units (i.e., assemblies). The system illustrated in FIG. 6 and the method illustrated in FIG. 7 cover a system having two lighting units/assemblies in order to generally address the interaction between the performance of a first lighting unit and the closed loop control of a second lighting unit based on a detected performance of the first lighting unit.

In some embodiments, lighting performance information may be collected from the lighting units themselves. Additionally or alternatively, in some embodiments, lighting performance information may be collected from one or more light sensors. For example, as shown in FIG. 6, the system includes a first intensity sensor 610 and a second intensity sensor 2. As discussed above with respect to FIG. 1, the location and implementation of such light sensors may vary.

As shown in FIG. 6, the system also includes a controller 620. Controller 620 includes various computing and communications hardware, such as servers, circuitry, displays, etc. Further, controller 620 includes a device processor 625 and a non-transitory computer readable medium 630 including instructions executable by device processor 625 to perform the processes discussed herein.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 620 may include networking hardware configured to interface with other nodes of a network, such as a LAN, WLAN, or other networks. In Further, controller 620 may be configured to receive data from a plurality of sources and communicate information to one or more external destinations. Accordingly, controller 620 may include a receiver 635 and a transmitter 640. (It will be appreciated that, in some embodiments, the receiver and transmitter may be combined in a transceiver.)

Any suitable communication platforms and/or protocols may be utilized for communication between controller 620 and other components of the system. Since the various sources of information may each have their own platform and/or protocol, the system may be configured to interface with each platform and/or protocol to receive the data.

In some embodiments, computer readable medium 630 of controller 620 includes instructions, executable by processor 625, to control the first lighting assembly 600 based on output of the second lighting assembly 605 in real time. For example, in some embodiments, computer readable medium 630 includes instructions for receiving lighting performance information from second lighting assembly 605 and controlling operation of first lighting assembly 600 based on the performance information regarding second lighting assembly 605. In some embodiments, computer readable medium 630 includes instructions for receiving lighting performance information regarding the second lighting assembly from the second light sensor 615 and controlling operation of first lighting assembly 610 based on the performance information regarding second lighting assembly 605 detected by second light sensor 615.

As discussed above, the system may include one or more reflective components incorporated into the lighting assemblies and/or disposed separate from the lighting assemblies. In some embodiments, computer readable medium 630 includes instructions, executable by processor 625, for controlling movement of the one or more reflective components to augment output of one or more of the lighting assemblies.

It will be understood that the system may also be configured to control operation of second lighting assembly 605 based on lighting performance information regarding first lighting assembly 600.

Moreover, the lighting performance information may include any lighting information indicative of unit performance. For example, the collected lighting performance information may include light intensity/brightness at the unit, proximate the unit, and/or in an area illuminated by the unit. In some embodiments, the lighting performance information may include information about individual LEDs that are underperforming or not illuminating at all.

The system may be configured to control the overall output of the light assemblies. Additionally or alternatively, the system may be configured to control operation of individual LEDs. For example, if one or more LEDs of a given lighting assembly are not illuminating, the discharge of other LEDs within the same lighting assembly may be increased in order to compensate for reduced lighting output of the unit. Additionally or alternatively, if one or more LEDs of a given lighting assembly are not illuminating, the discharge of LEDs within another lighting assembly may be increased in order to compensate.

A method of illuminating a vehicle interior utilizes a device processor to execute the following instructions stored on a computer readable medium. The method includes receiving lighting performance information regarding a first lighting assembly and receiving lighting performance information regarding a second lighting assembly. In addition, the method includes making a determination that the second lighting assembly is not operating as intended and adjusting operation of the first lighting assembly to at least partially compensate for a reduction in lighting performance of the second lighting assembly.

Also, the method includes making a determination that the first lighting assembly is not operating as intended and adjusting operation of the second lighting assembly to at least partially compensate for a reduction in lighting performance of the first lighting assembly.

As discussed above, in some embodiments, the lighting performance information received for the second lighting assembly is received from the second lighting assembly itself. As also discussed above, in some embodiments, the lighting performance information received for the second lighting assembly is received from a sensor separate from the second lighting assembly.

Figure 7:
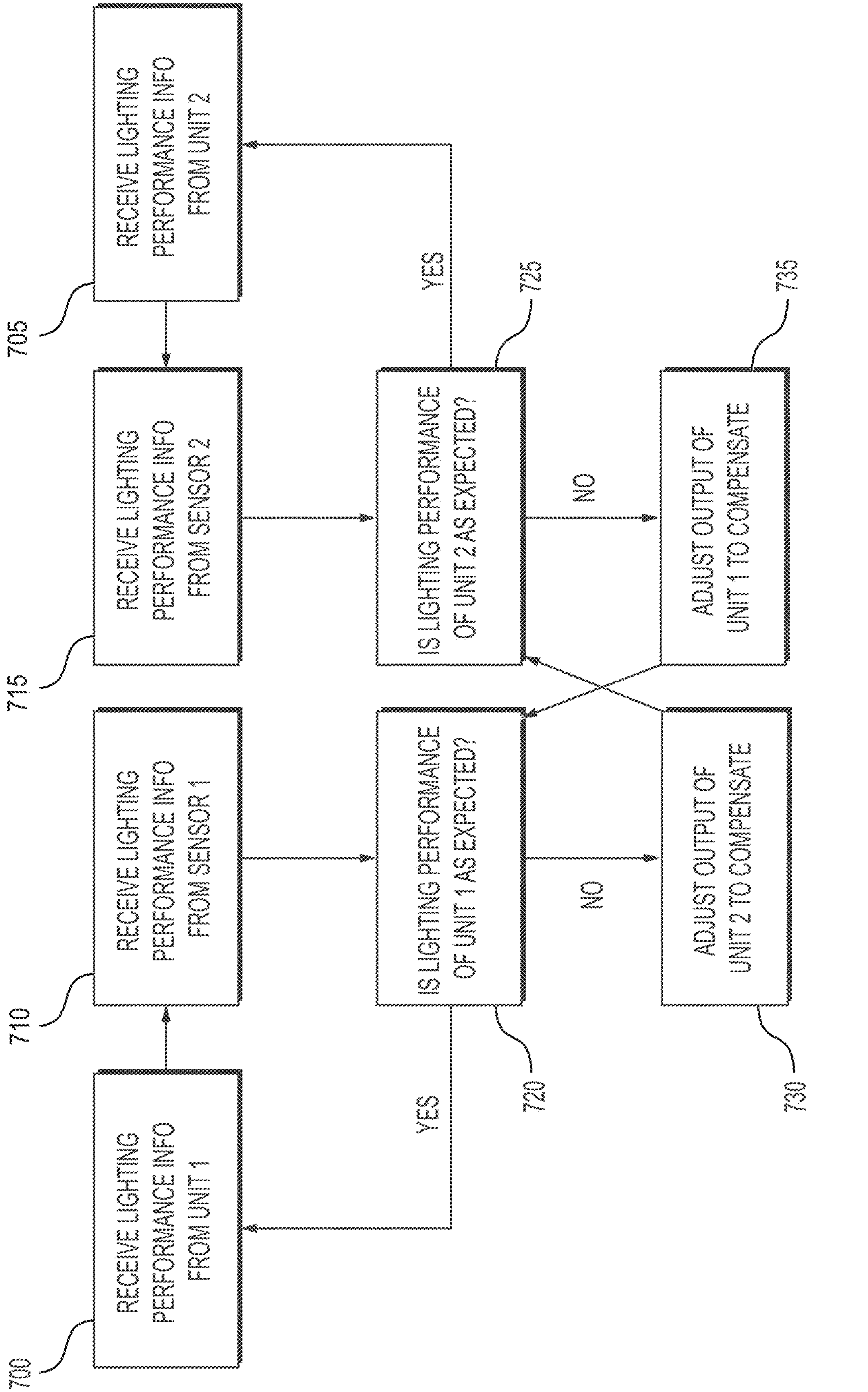
FIG. 7 is a flowchart illustrating an exemplary method of operating a vehicle interior lighting system.

FIG. 7 is a flowchart illustrating an exemplary method of operating a vehicle interior lighting system. The method includes receiving lighting performance information from a first lighting assembly (step 700) and receiving lighting performance information from a second lighting assembly (step 705). Additionally or alternatively, the method includes receiving lighting performance information from a first light sensor (step 710) and receiving lighting performance information from a second light sensor (step 715).

The method also includes making a determination as to whether the first lighting assembly is performing as expected (step 720). The method also includes making a determination as to whether the second lighting assembly is performing as expected (step 725). To make these determinations, the system may be configured to evaluate various lighting performance parameters individually and/or collectively.

If the first lighting assembly is performing as expected, the process returns to step 700 to continue collecting lighting performance information regarding the first lighting assembly. Simultaneously, if the second lighting assembly is performing as expected, the process returns to step 705 to continue lighting performance information regarding the second lighting assembly.

If the first lighting assembly is determined to NOT be performing as expected, the process proceeds to step 730 where the output of the second lighting assembly is adjusted in order to compensate for the diminished performance of the first lighting assembly. Similarly, if the second lighting assembly is determined to NOT be performing as expected, the process proceeds to step 735 where the output of the first lighting assembly is adjusted in order to compensate for the diminished performance of the second lighting assembly. Although the method of FIG. 7 illustrates cross-unit compensation where the performance of one unit is controlled based on the performance of another unit, it will be understood that this method is merely exemplary. As discussed above, output of individual LEDs within a given lighting assembly may be controlled in order to compensate for LED failure within the same lighting assembly.

In addition, as discussed above, the disclosed method may include moving at least one reflective component to augment the output of the first lighting assembly based on the collected lighting performance information.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A vehicle interior lighting system, comprising:
- a first vehicle interior lighting assembly including:
  - a lens through which light may be projected; and
  - a light source including a flexible sheet including one or more light emitting diodes (LEDs) arranged to project light through the lens;
- a second vehicle interior lighting assembly including the same general components as the first vehicle interior lighting assembly, including a lens and a flexible sheet including one or more LEDs; and
- a controller including a device processor and a non-transitory computer readable medium including instructions executable by the processor to control operation of the lighting assembly including controlling the first lighting assembly based on output of the second lighting assembly in real time;
- wherein the first lighting assembly includes a housing that extends at an oblique angle with respect to the lens.

2. The system of claim 1, wherein the computer readable medium includes instructions for receiving lighting performance information from the second lighting assembly and controlling operation of the first lighting assembly based on the performance information regarding the second lighting assembly.

3. The system of claim 1, further including a sensor separate from the second lighting assembly configured to detect the output of the second lighting assembly;
- wherein the computer readable medium includes instructions for receiving lighting performance information regarding the second lighting assembly from the sensor and controlling operation of the first lighting assembly based on the performance information regarding the second lighting assembly.

4. The system of claim 1, wherein the first lighting assembly includes one or more reflective components configured to reflect additional light from the LEDs through the lens.

5. The system of claim 4, wherein the computer readable medium includes instructions, executable by the processor, for controlling movement of the one or more reflective components to augment output of the first lighting assembly.

6. The system of claim 1, further including a reflective component separate from the first lighting assembly configured to reflect light from the first lighting assembly and redirect the light to a predetermined target area.

7. The system of claim 6, wherein the computer readable medium includes instructions, executable by the processor, for controlling movement of the reflective component to augment output of the first lighting assembly.

8. A system for illuminating a vehicle interior, comprising:
- a first lighting assembly;
- a second lighting assembly; and
- a device processor and a non-transitory computer readable medium having instruction stored thereon and executable by the processor to perform the following steps:
- receiving lighting performance information regarding the first lighting assembly;
- receiving lighting performance information regarding the second lighting assembly;
- making a determination that the second lighting assembly is not operating as intended; and
- adjusting operation of the first lighting assembly to at least partially compensate for a reduction in lighting performance of the second lighting assembly, including moving at least one reflective component to augment the output of the first lighting assembly.

9. The system of claim 8, wherein the computer readable medium further includes instructions for:
- making a determination that the first lighting assembly is not operating as intended; and
- adjusting operation of the second lighting assembly to at least partially compensate for a reduction in lighting performance of the first lighting assembly.

10. The system of claim 8, wherein the lighting performance information received for the second lighting assembly is received from the second lighting assembly itself.

11. The system of claim 8, wherein the lighting performance information received for the second lighting assembly is received from a sensor separate from the second lighting assembly.

12. The system of claim 8, wherein the reflective component is disposed within the lighting assembly.

13. A method of illuminating a vehicle interior, comprising:
- using a device processor to execute the following instructions stored on a non-transitory computer readable medium:
- receiving lighting performance information regarding a first lighting assembly;
- receiving lighting performance information regarding a second lighting assembly;
- making a determination that the second lighting assembly is not operating as intended; and
- adjusting operation of the first lighting assembly to at least partially compensate for a reduction in lighting performance of the second lighting assembly, including moving at least one reflective component to augment the output of the first lighting assembly.

14. The method of claim 13, further including:
- making a determination that the first lighting assembly is not operating as intended; and
- adjusting operation of the second lighting assembly to at least partially compensate for a reduction in lighting performance of the first lighting assembly.

15. The method of claim 13, wherein the lighting performance information received for the second lighting assembly is received from the second lighting assembly itself.

16. The method of claim 13, wherein the lighting performance information received for the second lighting assembly is received from a sensor separate from the second lighting assembly.

17. The method of claim 13, wherein the reflective component is disposed within the lighting assembly.

* * * * *